United States Patent [19]

Stock et al.

[11] Patent Number: 4,573,107
[45] Date of Patent: Feb. 25, 1986

[54] STEERABLE SPOTLIGHT ASSEMBLY

[76] Inventors: David Stock, 15249 Sobey Rd., Saratoga, Calif. 95070; William Akers, 4137 Leigh Ave., San Jose, Calif. 95124

[21] Appl. No.: 656,323

[22] Filed: Oct. 1, 1984

[51] Int. Cl.[4] .............................................. B60Q 1/12
[52] U.S. Cl. ...................................... 362/49; 362/53; 362/233; 362/428
[58] Field of Search ....................... 362/43, 44, 49, 53, 362/55, 66, 233, 428

[56] References Cited

U.S. PATENT DOCUMENTS

| 1,324,652 | 12/1919 | Erhart | 362/49 |
| 1,447,120 | 2/1923 | Brunker | 362/49 |
| 1,781,137 | 11/1930 | Snyder | 362/49 |
| 3,168,251 | 2/1965 | Carter | 362/49 |

FOREIGN PATENT DOCUMENTS

| 55-39825 | 3/1980 | Japan | 362/53 |

Primary Examiner—Andrew M. Dolinar
Attorney, Agent, or Firm—Paul L. Hickman

[57] ABSTRACT

A steerable spotlight assembly characterized by a pair of spotlights rotatably coupled to a vehicle's front bumper, and a cable-and-gear arrangement which couples the spotlights to the vehicle's steering column. More specifically, the cable-and-gear arrangement includes a spotlight rotating mechanism attached to each of the spotlights, a split gear attached around the steering column, a pair of cable drive gears simultaneously engaged with the split steering column gear, and a pair of rotary cables coupled between the cable drive gears and the spotlight rotating mechanisms. The cable drive gears are spring loaded so that they may disengage from the steering column gear if the steerable spotlight assembly becomes jammed. The spotlight rotating mechanisms are sealed and supported so as to be resistant to environmental damage, and provided with a gearing system which will not permit rotational force to be transmitted back from the spotlights to the cables.

17 Claims, 6 Drawing Figures

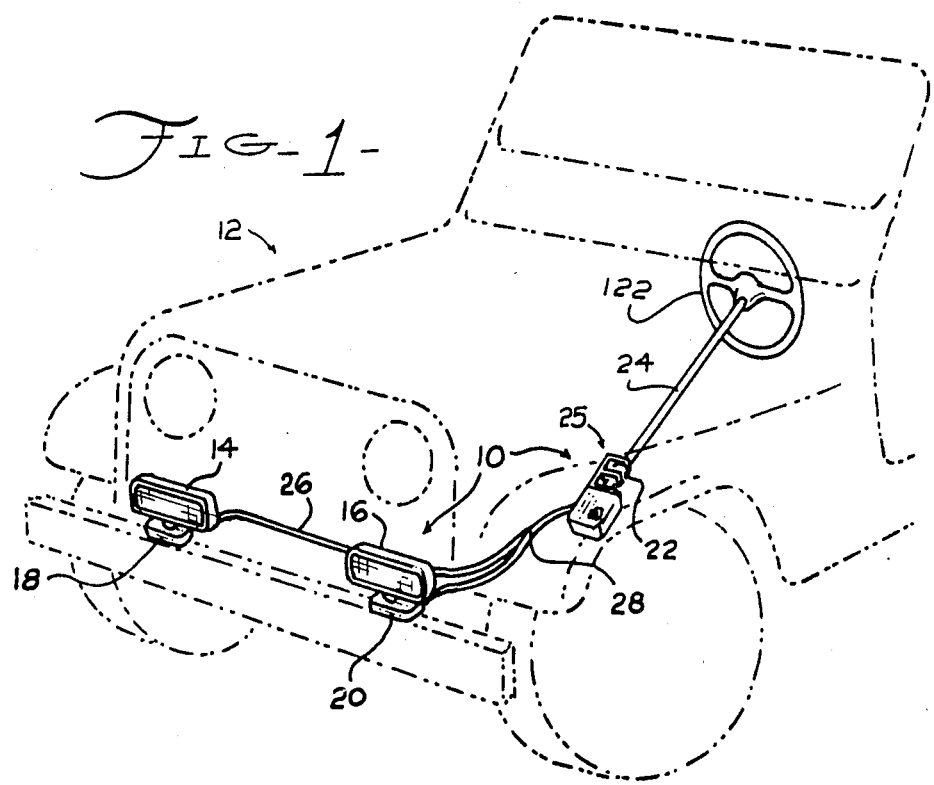
FIG-1-
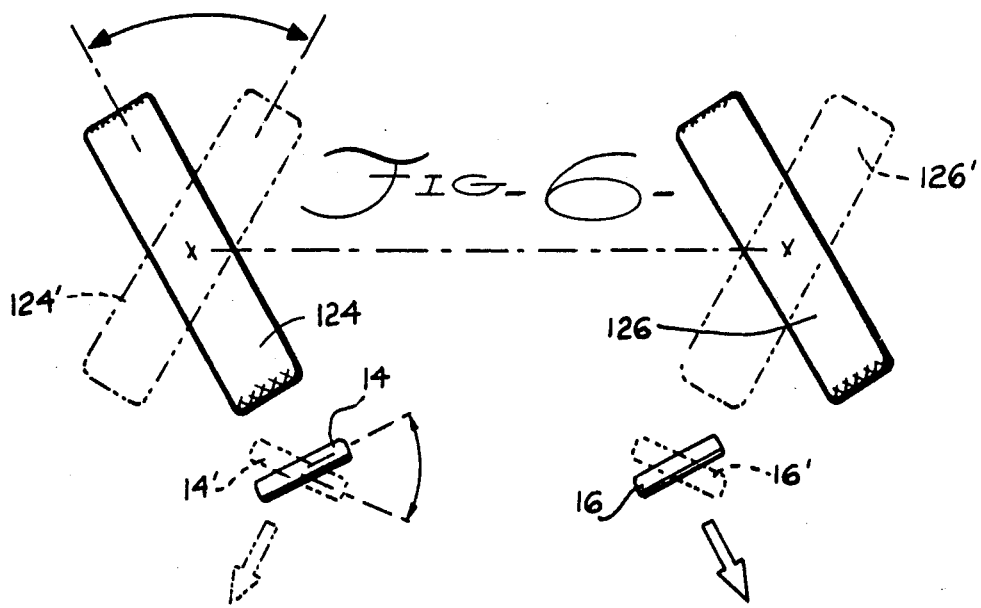
FIG-6-

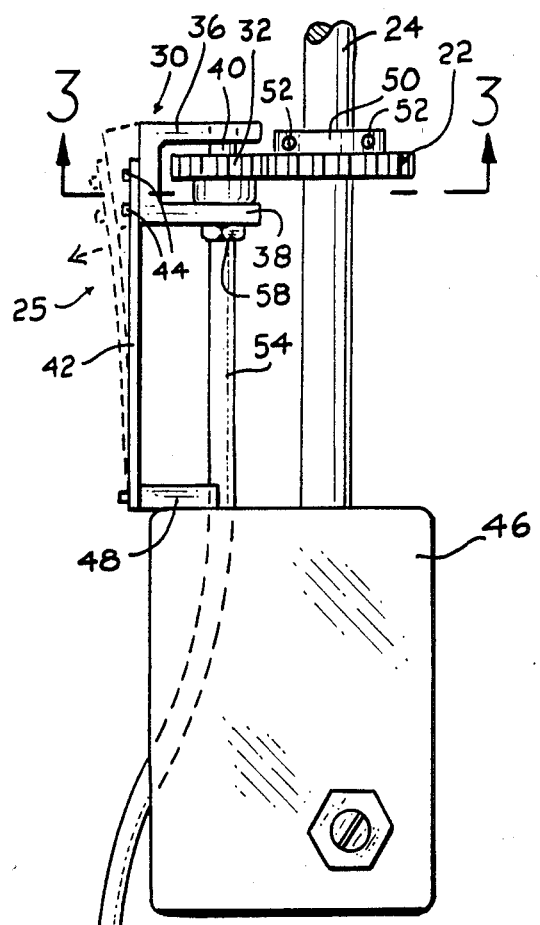
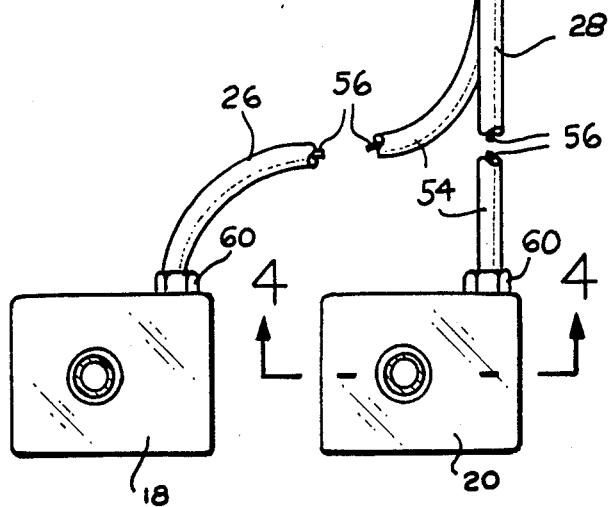
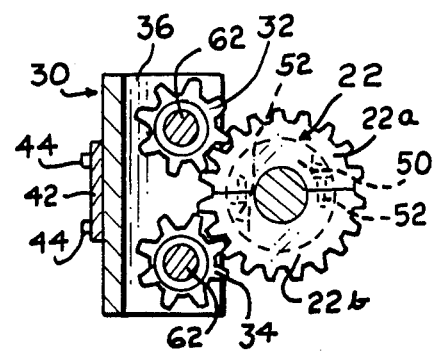
FIG-2-
FIG-3-

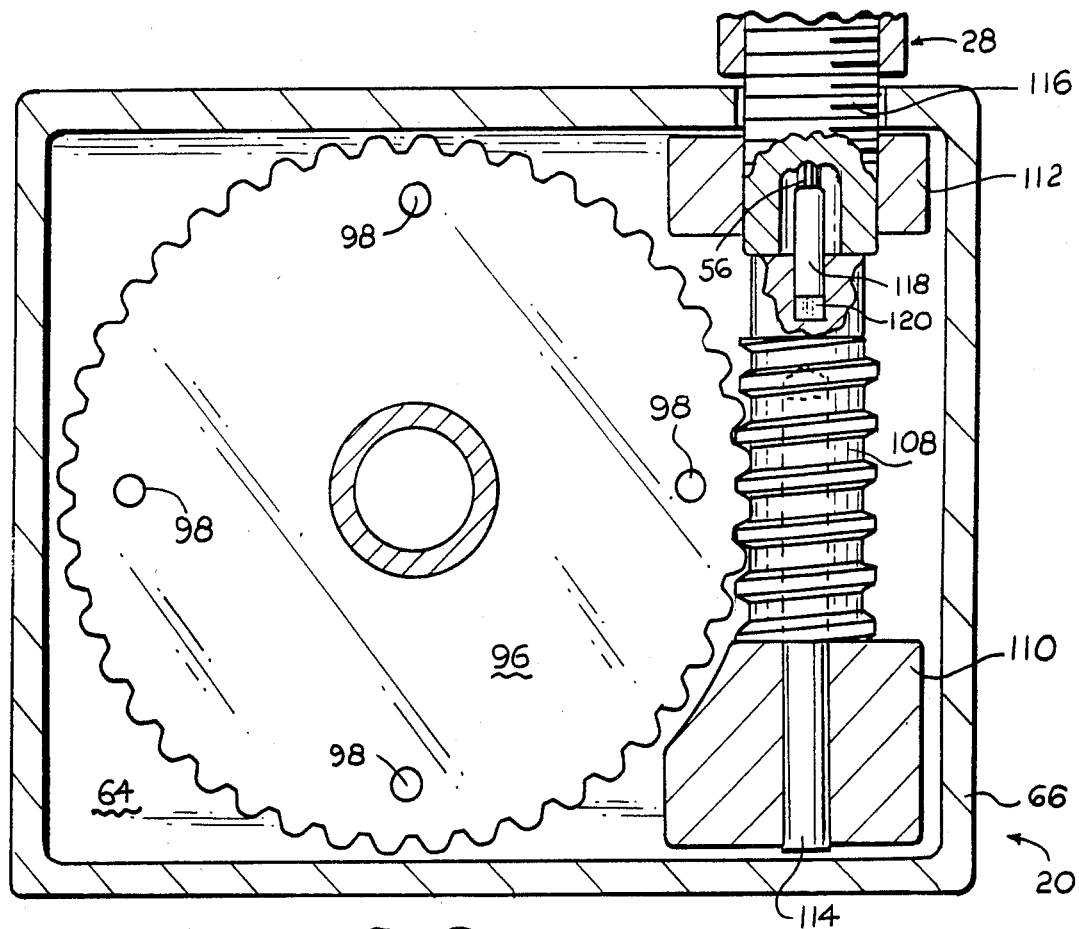
FIG-5-
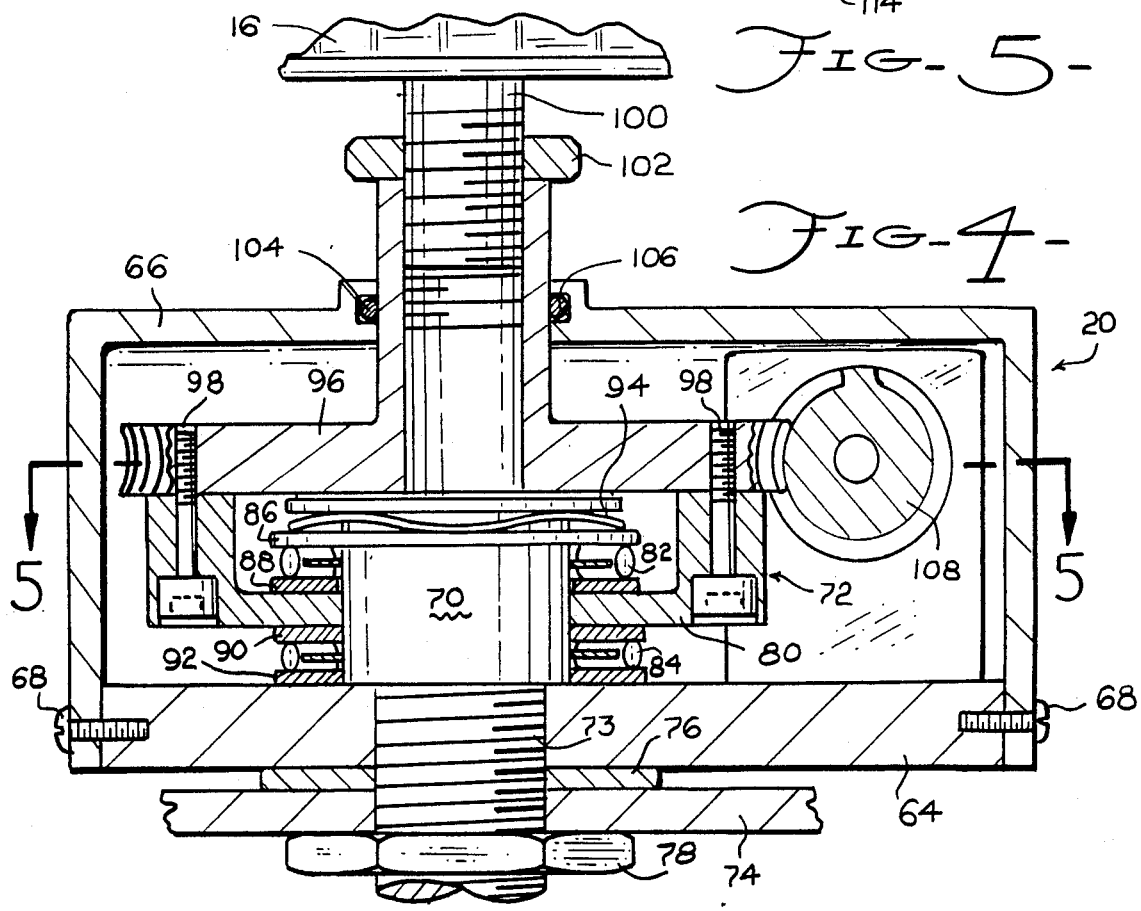
FIG-4-

STEERABLE SPOTLIGHT ASSEMBLY

BACKGROUND OF THE INVENTION

1. Field of the Invention

This invention relates generally to automobile accessories and more particularly to auxiliary, steerable spotlight assemblies.

2. Description of the Prior Art

For the drivers of most automobiles, trucks, and other motorized vehicles, turning a corner or making other sharp turns at night can be dangerous. The reason for this is that the headlights for most vehicles are fixed in position and thus point in the direction that the vehicle is pointing and not in the direction that the vehicle is turning.

A solution to this problem is to provide auxiliary spotlights which turn as the vehicle turns. By providing such auxilliary spotlights the ground over which the vehicle is about to travel is safely illuminated.

A typical steerable spotlight of the prior art is disclosed in U.S. Pat. No. 1,789,162 of Thorne and includes a pair of spotlights rotatably attached to the front of a car and connected together with a solid link, and a rotary cable which couples one of the spotlights to the car's steering column. As the steering column rotates, the cable is caused to rotate which, in turn, rotates the spotlight to which it is attached. The other spotlight rotates in the same direction due to the solid link between the two spotlights.

In U.S. Pat. No. 3,168,251 of Carter, a pair of spotlights are independently rotated by a pair of cables. A spur gear is provided around the car's steering column which simultaneously engages a pair of spur gears attached to ends of the two cables. The two cable assembly of Carter eliminates the need for mechanical linkage between the pair of spotlights, and may be more suitable for modern vehicles.

Other rotary cable assemblies for steering spotlights can be found in U.S. Pat. Nos. 1,861,199 and 1,324,652. A pull cable assembly for the same purpose is described in U.S. Pat. No. 1,595,879.

A number of prior art patents describe spotlight steering assemblies which used solid, mechanical links to couple the rotation of a steering column to a pair of movable spotlights. Examples of such spotlight steering assemblies can be found in U.S. Pat. Nos. 1,005,626, 1,638,802, and 1,268,675.

A problem with prior art spotlight steering assemblies is that the mechanism of the assembly which turns the spotlight is often exposed to harsh environmental conditions. Most prior art steerable spotlights are mounted on the front bumper or grill of the car. In that position, they are constantly exposed to dirt, mud, rain, et cetera which can infiltrate and jam the gears which turn the spotlights.

Another problem with prior art spotlight steering assemblies is that a jammed or frozen mechanism can prevent the steering column from rotating, with possibly dire consequences. For example, with Carter's spotlight steering assembly the two cable driving gears are solidly coupled to the steering column gear. If either of the cables were to become frozen, or if the headlight rotating mechanism were to become jammed, the driver of a vehicle equipped with Carter's assembly may not be able to steer properly.

A still further problem with the prior art is that rotational force can often be transmitted back to the steering column from the spotlights or any intervening linkages. For example, if the spotlights of the prior art were struck on one side by a branch, the spotlight could be pivoted, causing the vehicle to swerve towards the tree to which the branch is connected.

SUMMARY OF THE INVENTION

An object of this invention is to provide an easy to install and safe spotlight steering assembly.

Another object of this invention is to provide a spotlight steering assembly which is resistant to environmental degradation.

Yet another object of this invention is to provide a spotlight steering assembly which does not transmit rotational forces back to the steering column from the spotlights or any intervening linkages.

Briefly, the invention comprises a pair of spotlights, a pair of spotlight rotating mechanisms attaching the spotlights to the vehicle, a steering column gear, a cable drive mechanism including a pair of cable drive gears engagable with the steering column gear, and a pair of cables coupling the two cable drive gears to the two spotlight rotating mechanisms. As the steering column is turned, the cables cause the spotlight rotating mechanisms to rotate the spotlights in the direction that the vehicle is turning.

The cable drive mechanism includes a drive gear housing which rotatably supports the cable drive gears so that they may simultaneously engage the steering column gear within 180° of each other. The drive gear housing is supported by an elongated, flat leaf spring which is attached to a fixed portion of the vehicle, such as the steering gear box. If the torque required to rotate either of the two cable drive gears exceeds a level determined by the biasing force of the leaf spring, the steering column gear is able to rotate by flexing the cable drive gears away against the biasing force.

The spotlight rotating mechanisms are designed to allow the cable to rotate the spotlight and not vice versa. This design feature is accomplished with a worm gear attached to the end of the cable, and a wheel gear engaged with the worm gear and attached to a rotatable support assembly and to the spotlight. The spotlight rotating mechanisms are also designed to be environmentally resistant by providing a sealed housing around the gears and by utilizing spring loaded thrust bearings in the support assembly.

An advantage of this invention is that it is relatively immune to environmental damage.

Another advantage of this invention is that rotational forces exerted upon components of the assembly from external sources will not be transmitted back to the steering column of the vehicle.

Yet another advantage of this invention is that the cable drive mechanism permits the steering column to rotate without rotating the cable drive gears if the torque required to rotate the cable drive gears exceeds a certain level.

These and other objects and advantages of the present invention will no doubt become apparent upon a reading of the following descriptions and a study of the several figures of the drawing.

BRIEF DESCRIPTION OF THE DRAWING

FIG. 1 is a perspective view of a spotlight steering assembly in accordance with the present invention, and a phantom perspective view of a typical vehicle to which the assembly could be attached.

FIG. 2 is a top plan view of the spotlight steering assembly as it is attached to the steering column and steering wheel gear box.

FIG. 3 is a cross-sectional view taken along line 3—3 of FIG. 2.

FIG. 4 is a cross-sectional view taken along line 4—4 of FIG. 2.

FIG. 5 is a cross-sectional view taken along line 5—5 of FIG. 4.

FIG. 6 is a pictorial view illustrating the operation of the spotlight steering assembly.

DETAILED DESCRIPTION OF THE PREFERRED EMBODIMENT(S)

Referring to FIG. 1, a steerable spotlight assembly 10 in accordance with the present invention is shown attached to a vehicle 12. The present invention is particularly well adapted for off-road vehicles such as jeeps and four-wheel drive trucks, but can also be used with virtually any type of automobile, truck, or passenger vehicle.

The assembly includes a pair of spotlights 14 and 16, a pair of spotlight rotating mechanisms 18 and 20, a steering column gear 22 attached to the steering column 24 of vehicle 12, a cable drive mechanism 25 engaged with steering column gear 22 and a pair of rotary drive cables 26 and 28 coupled between cable drive mechanism 25 and spotlight rotating mechanisms 18 and 20, respectively.

Referring now to FIGS. 2 and 3, cable drive mechanism 25 includes a channel shaped housing 30 and a pair of cable drive gears 32 and 34 rotatably coupled between side wall portions 36 and 38 of housing 30 by axle pins 40.

Housing 30 of cable driving mechanisms 25 is attached to one end of an elongated, flat leaf spring 42 by a pair of fasteners 44. The other end of leaf spring 42 is attached to a stationary portion of the vehicle (such as steering gear box 46) by means of a bracket 48. The leaf spring 42 permits housing 30, and thus cable drive gears 32 and 34, to move away from steering column 24 to disengage the teeth of gears 32 and 34 from the teeth of gear 22.

Steering column gear 22 is of the split-ring type having a flange portion 50 provided with screws 52 for attaching the two portions of gear 22 (labeled 22a and 22b) together. By using a split steering column gear 22, the steering column gear 22 can be retrofitted to steering column 24 without disassembling the steering mechanism of the vehicle.

Cables 26 and 28 include an outer sheath 54 with a rotatable wire 56 of the wire 56 at one end of cable 26/28 will cause the wire 56 to rotate along the full length of the cable. As seen in FIG. 2, the sheaths 54 of cable 26/28 are attached at one end by a nut 58 to end wall portion 38 of housing 30, and are attached at their other end to the housings of rotating mechanisms 18/20 by nuts 60. As been seen in FIG. 3, ends of wire 56 are attached to end fittings 62 which engage splined bores provided in cable drive gears 32/34. Thus, as cable drive gears 32/34 are rotated by steering column gear 22, the wires 56 within rotary drive cables 26/28 will rotate.

Referring now to FIGS. 4 and 5, rotating mechanism 20, and by analogy rotating mechanism 18, each include a base 64, and a housing 66 secured to base 64 by suitable fasteners such as machine screws 68. Located within housing 66 is a fixed support shaft 70 and a rotatable support assembly 72. A threaded portion 73 extends from fixed support shaft 70 through apertures provided in base 64 and in bumper 74 of the vehicle. A washer 76 and nut 78 attach the threaded portion 73 firmly to the vehicle.

Rotatable support assembly 72 includes a support plate 80 provided with a central bore receptive to the cylindrical outer surface of fixed support shaft 70. Support plate 80 is free to rotate around support shaft 70.

A pair of thrust bearings 82 and 84 are disposed around shaft 70 on either side of support plate 80. A shoulder 86 is provided around shaft 70, and a number of washers 88, 90, and 92 further serve as shoulders against which thrust bearings 82/84 may bear. An undulating leaf spring 94 biases washer 86 against thrust bearing 82, and that biasing force is transmitted through washer 88, support plate 80, washer 90, thrust bearing 84, and washer 92 to base 64. Thus, support plate 80 is firmly but rotatably coupled to support shaft 70.

A wheel gear 96 is rigidly attached to support plate 80 such as by machine screws 98. An upwardly extending, hollow threaded column 98 allows the wheel gear 96 to be attached to a downwardly extending threaded stud 100 of light 16. A lock nut 102 secures stud 100 to column 98, and an O-ring 104 provided in a groove 106 in housing 66 provides a weather proof seal around the rotatable column 98.

Still referring to FIGS. 4 and 5, a worm gear 108 is rotatably supported between two posts 110 and 112 by an axle pin 114. Worm gear 108 is engaged with wheel gear 96 such that rotation of worm gear 108 causes a corresponding rotation of wheel gear 96. It should be noted, however, that wheel gear 96 cannot rotate worm gear 108, and thus rotational force exerted on spotlight 16 cannot be transmitted back through the assembly to the steering column.

An end of rotary drive cable 28 is engaged with a fitting 116 which allows the cable to be attached to a threaded bore provided in post 112. The end of wire 56 is attached to another fitting 118, which, in turn, engages a bore 120 of worm gear 108. Fitting 118 is configured to engage splined or beveled surfaces provided in bore 120 so that worm gear 108 rotates as wire 56 of rotary drive cable 28 rotates.

Operationally, and with reference to FIGS. 1 and 6, as the driver rotates steering wheel 122 in a counterclockwise direction, the tires 124 and 126 will pivot as indicated in solid lines in FIG. 6. Simultaneously, the rotation of steering column 24 will be transmitted through cable drive mechanism 25, cables 26 and 28, two rotating mechanisms 18 and 20, respectively. The rotating mechanisms 18 and 20 cause spotlights 14 and 16 to pivot as shown in FIG. 6. When the steering wheel 122 is rotated in a clockwise direction the wheels are caused to turn to positions shown at 124' and 126', and the spotlights are rotated to the position shown at 14' and 16'.

In some applications it is desirable to have the spotlights point downwardly as the vehicle turns to the left or to the right to prevent approaching drivers from being blinded. This result is easily accomplished by angling the rotating mechanisms 18/20 towards the rear of the vehicle, and by angling the spotlights 14/16 such that they are upright when they are facing forwardly. As the spotlights 14/16 are rotated to the left or right, they are turned towards the ground by the angle of the rotating mechanisms 14/16.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. A steerable spotlight assembly for a vehicle having a steering wheel attached to a steering column, said assembly comprising:
   at least one spotlight;
   a spotlight rotating mechanism attaching said spotlight to said vehicle;
   a steering column gear operationally attached around said steering column of said vehicle;
   a cable drive mechanism including at least one cable drive gear, and biasing means for operationally biasing said cable drive gear against said steering column gear, said biasing means permitting said cable drive gear to disengage from said steering column gear when the torque required to rotate said cable drive gear exceeds a predetermined level; and
   cable means coupling said cable drive gear to said spotlight rotating mechanism, whereby rotation of said steering wheel results in a corresponding rotation of said spotlight.

2. A steerable spotlight assembly as recited in claim 1 further comprising a second spotlight, a second spotlight turning mechanism attaching said second spotlight to said vehicle, a second cable drive gear operationally biased against said steering column gear by said biasing means, and second cable means coupling said second cable drive gear to said second spotlight rotating mechanism, whereby rotation of said steering wheel results in a corresponding rotation of second spotlight.

3. A steerable spotlight assembly as recited in claim 2 wherein said cable drive mechanism further includes a cable drive gear housing for rotatably supporting said first cable drive gear and said second cable drive gear such that they may simultaneously engage said steering column gear, and spring means coupled to said vehicle and operative to bias said cable drive gear housing towards said steering column gear.

4. A steerable spotlight assembly as recited in claim 3 wherein said cable drive gear housing is a channel shaped member provided with a first gear axle extending between opposing walls thereof and adapted to support said first cable drive gear, and a second gear axle extending between opposing walls thereof and spaced from said first gear axle, said second gear axle being adapted to support said second cable drive gear.

5. A steerable spotlight assembly as recited in claim 4 wherein said spring means includes an elongated leaf spring which is attached at one end to said cable drive gear housing and which is attached at its other end to a fixed portion of said vehicle, said leaf spring allowing said cable drive gear housing to move away from said steering column and thus disengage said first cable drive gear and said second cable drive gear from said steering column gear when the torque required to rotate said first cable drive gear and said second cable drive gear exceed said predetermined level.

6. A steerable spotlight assembly as recited in claim 2 wherein said first spotlight rotating mechanism and said second spotlight rotating mechanism each include a fixed base portion adapted to be attached to said vehicle, a support assembly rotatably coupled to said fixed base portion and attached to said rotatable spotlight; and means coupling said cable means to said support assembly.

7. A steerable spotlight assembly as recited in claim 6 wherein said means coupling said cable means to said support assembly includes a wheel gear attached to said support assembly, and a worm gear attached to said cable means and rotatably mounted to said base portion in engagement with said wheel gear, said worm gear being rotated by the rotation of said cable.

8. A steerable spotlight assembly as recited in claim 7 wherein said support assembly further includes a fixed post, a gear base supporting said wheel gear and rotatably engaged with said support post, a pair of thrust bearings disposed around said fixed post on either side of said gear base, and a leaf spring disposed around said fixed post to bias said thrust bearings against said gear base.

9. A steerable spotlight assembly as recited in claim 7 wherein said wheel gear includes an upwardly extending member engagable with a downwardly depending member provided on said spotlight.

10. In a steerable spotlight assembly including a spotlight, spotlight rotation means for pivoting said spotlight, cable drive means coupled to a vehicle's steering column, and a rotary cable connecting said cable drive means to said spotlight rotation means; an improved cable drive means comprising:
    a steering column gear coaxially attached to said steering column;
    at least one cable drive gear engagable with said steering column gear; and
    means for biasing said cable drive gear towards said steering column gear such that said cable drive gear rotates with said steering column gear when the torque required to rotate said cable drive gear is less than a certain level, and such that said cable drive gear is does not rotate with said cable drive gear when the torque required to rotate said cable drive gear is greater than said level.

11. An improved cable drive means as recited in claim 10 wherein said steering column gear includes a pair of gear halves, and means for attaching said gear halves around said steering column.

12. An improved cable drive means as recited in claim 10 further comprising a second cable drive gear engagable with said steering column gear and biased towards said cable drive gear by said means for biasing.

13. An improved cable drive means as recited in claim 12 wherein said cable drive means further includes a housing for rotatably supporting said first cable drive gear and said second cable drive gear for simultaneous engagement with said steering column gear.

14. An improved cable drive means as recited in claim 13 wherein said means for biasing includes a spring coupled between said housing and said vehicle.

15. An improved cable drive means as recited in claim 14 wherein said spring is an elongated, flat leaf spring.

16. In a steerable spotlight assembly including a spotlight, spotlight rotation means for pivoting said spotlight, cable drive means coupled to a vehicle's steering column, and a rotary cable connecting said cable drive means to said spotlight rotation means; an improved spotlight rotation means comprising:
- a fixed base portion adapted to be attached to said vehicle;
- a support assembly rotatably coupled to said fixed base portion and attached to said rotatable spotlight, said support assembly including a fixed post, a gear base rotatably engaged with said fixed post, a pair of thrust bearings disposed around said fixed post on either side of said gear base, and a leaf spring disposed around said fixed post to bias said thrust bearings against said gear base; and
- means coupling said cable to said support assembly including a spur gear attached to said gear base, and a worm gear attached to said cable means and rotatably mounted to said base portion in engagement with said spur gear.

17. A steerable spotlight assembly as recited in claim 16 wherein said spur gear includes an upwardly extending member engagable with a downwardly depending member provided on said spotlight.

* * * * *